United States Patent
Shimura

[11] Patent Number: 5,839,811
[45] Date of Patent: Nov. 24, 1998

[54] AUTOMOTIVE METER ASSEMBLY

[75] Inventor: Koichi Shimura, Taipei, Taiwan

[73] Assignee: Kansei Corporation, Omiya, Japan

[21] Appl. No.: 803,181

[22] Filed: Feb. 19, 1997

[30] Foreign Application Priority Data

Feb. 19, 1996 [JP] Japan .................................... 8-030915

[51] Int. Cl.⁶ .................................................. G01D 11/28
[52] U.S. Cl. ............................. 362/30; 362/29; 362/267; 116/48; 116/DIG. 36
[58] Field of Search ................................ 362/23, 26–30, 362/267; 116/47–49, 286–288, DIG. 36

[56] References Cited

U.S. PATENT DOCUMENTS

| | | | |
|---|---|---|---|
| 3,053,337 | 9/1962 | Prohaska et al. | 362/23 |
| 4,215,647 | 8/1980 | Fukasawa | 362/29 |
| 5,142,274 | 8/1992 | Murphy et al | 362/23 |
| 5,227,767 | 7/1993 | Tanaka | 362/23 |

FOREIGN PATENT DOCUMENTS

| | | | |
|---|---|---|---|
| 55-59317 | 4/1980 | Japan . | |
| 6-221878 | 8/1994 | Japan . | |
| 2266375 | 10/1993 | United Kingdom | 362/28 |

*Primary Examiner*—Alan Cariaso
*Attorney, Agent, or Firm*—Foley & Lardner

[57] ABSTRACT

A meter assembly for motor vehicle comprises a meter case including rear and front housings which are coupled. The front housing has an opening formed therethrough. A meter unit is installed in the meter case. The meter unit includes a dial board facing toward the opening of the front housing, a transparent pointer movable over the dial board and a light emitting unit located in front of the pointer to emit light to illuminate the transparent pointer from within. A semitransparent dark cover covers the opening of the front housing.

9 Claims, 6 Drawing Sheets

AUTOMOTIVE METER ASSEMBLY

BACKGROUND OF THE INVENTION

1. Field of the Invention

The present invention relates in general to a meter employed in a motor vehicle, and more particularly to a meter assembly mounted on an instrument panel of the vehicle. More specifically, the present invention is concerned with automotive meter assemblies of a black face type whose dial board and pointer are not viewed when an ignition switch is kept OFF, but viewed or illuminated when the ignition switch is turned ON.

2. Description of the Prior Art

A black face type meter assembly generally comprises a meter case, a luminous meter unit installed in the meter case and a semitransparent dark cover covering a front opening of the meter case to conceal a front face of the meter unit. The luminous meter unit includes a dial board of transmitted illumination type, a luminous pointer disposed over the dial board and a lamp for illuminating the dial board and the pointer. Operation of the lamp is carried out synchronous with ON/OFF operation of an ignition switch. That is, when the ignition switch is kept OFF, the lamp is not energized and thus the luminous type meter unit is not illuminated. In this case, the front face of the meter unit (viz., the dial board and the pointer) is not viewed due to existence of the dark cover. While, when the ignition switch is turned ON, the lamp is energized to illuminate the dial board and the pointer. Thus, in this case, the front face of the meter unit is viewed through the semitransparent dark cover.

Due to nature of the semitransparent dark cover, it is preferable to heighten the illumination of the front face of the meter unit as high as possible for obtaining clear and precise recognition of the dial board and the pointer.

Hitherto, for heightening such illumination, various measures have been proposed, one of which is shown in Japanese Patent First Provisional Publication 6-221878.

The measure of 6-221878 publication is depicted by FIG. 6 of the accompanying drawings. In the drawing, do noted by numeral 8 is a transparent pointer which is driven at its base portion by a rotation shaft 10. Around the rotation shaft 10, there are arranged a plurality of light sources 9 (viz., light emitting diode (LED)). Although not shown in the drawing, in front of the pointer 8, there is arranged a semitransparent dark cover to cover the pointer 8 and a dial board (not shown). All light from the light sources 9 enters the pointer 8 through a light receiving part 10 formed on the base portion of the pointer 8. With this, the pointer 8 is sufficiently illuminated from within.

However, due to inherent construction, the meter assembly of 6-221878 has the following drawbacks.

That is, usage of such numerous light sources 9 induces not only increased cost of the meter assembly but also increased weight of the same. Furthermore, to conceal front faces of the light sources 9, it is necessary to provide the base portion of the pointer 8 with a larger screen board. This measure however increases the weight of the pointer 8 and thus lowers the movability of the same.

To obtain a high movability of a pointer, Japanese Utility Model First Provisional Publication 55-59317 shows a measure which is depicted by FIG. 7 of the accompanying drawings.

In the drawing, denoted by numeral 1 is a rotation shaft whose leading end is connected to a base portion of a transparent plastic pointer 2 to drive the same over a dial board (no numeral). The base portion of the pointer 2 is formed at a front face thereof with a light receiving recess 3. In front of the light receiving recess 3, there is arranged a light emitting unit "U". The light emitting unit "U" comprises a lamp 7 held by a valve holder 6 which is mounted on a support 4. The lamp 7 faces the light receiving recess 3 of the pointer 2. A printed wiring board 5 is attached to the support 4 to feed the lamp 7 with an electric power. Designated by numeral 50 is a transparent cover which is located in front of the light emitting unit "U". Light from the lamp 7 enters the pointer 2 through the light receiving recess 3, so that the pointer 2 is illuminated from within. Because the pointer 2 is light in weight, smooth and high responsive movement of the pointer 2 is obtained.

However, even the meter assembly of this publication has following drawbacks due to usage of the transparent cover 50. That is, the light emitting unit "U" is always viewed from the outside, which lowers the aesthetic value of the meter assembly. Furthermore, due to bulky construction of the light emitting unit "U", it is difficult to make the meter assembly compact. Furthermore, heat inevitably produced by the lamp 7 tends to deteriorate and deform the base portion of the plastic pointer 2. To prevent the heat generating lamp 7 from contacting the base portion of the thermally poor pointer 2, skilled and time-consuming assembling work is needed, which however causes increased cost of the same. In case wherein the heat of the lamp 7 is great, it is necessary to provide the meter assembly with a ventilation structure. However, in this case, due to usage of the ventilation structure through which the inside of the meter assembly and the outside of the same (that is, the passenger room of the vehicle) is freely communicated, various foreign things, such as cigarette smoke, fine dust and the like, tend to enter the inside of the meter assembly to contaminate the front face of the pointer 2 and that of the dial board.

SUMMARY OF THE INVENTION

It is therefore an object of the present invention to provide a black face type meter assembly which is free of the above-mentioned drawbacks.

It is another object of the present invention to provide a black face type meter assembly which is economical.

According to the present invention, there is provided a meter assembly which comprises a meter case including rear and front housings which are coupled, the front housing having an opening formed therethrough; a meter unit installed in the meter case, the meter unit including a dial board facing toward the opening of the front housing, a transparent pointer movable over the dial board and a light emitting unit located in front of the pointer to emit light to illuminate the transparent pointer from within; and a semitransparent dark cover which covers the opening of the front housing.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 5 of the drawings, there is shown a black face type meter assembly for a motor vehicle, according to the present invention.

Figure 2:
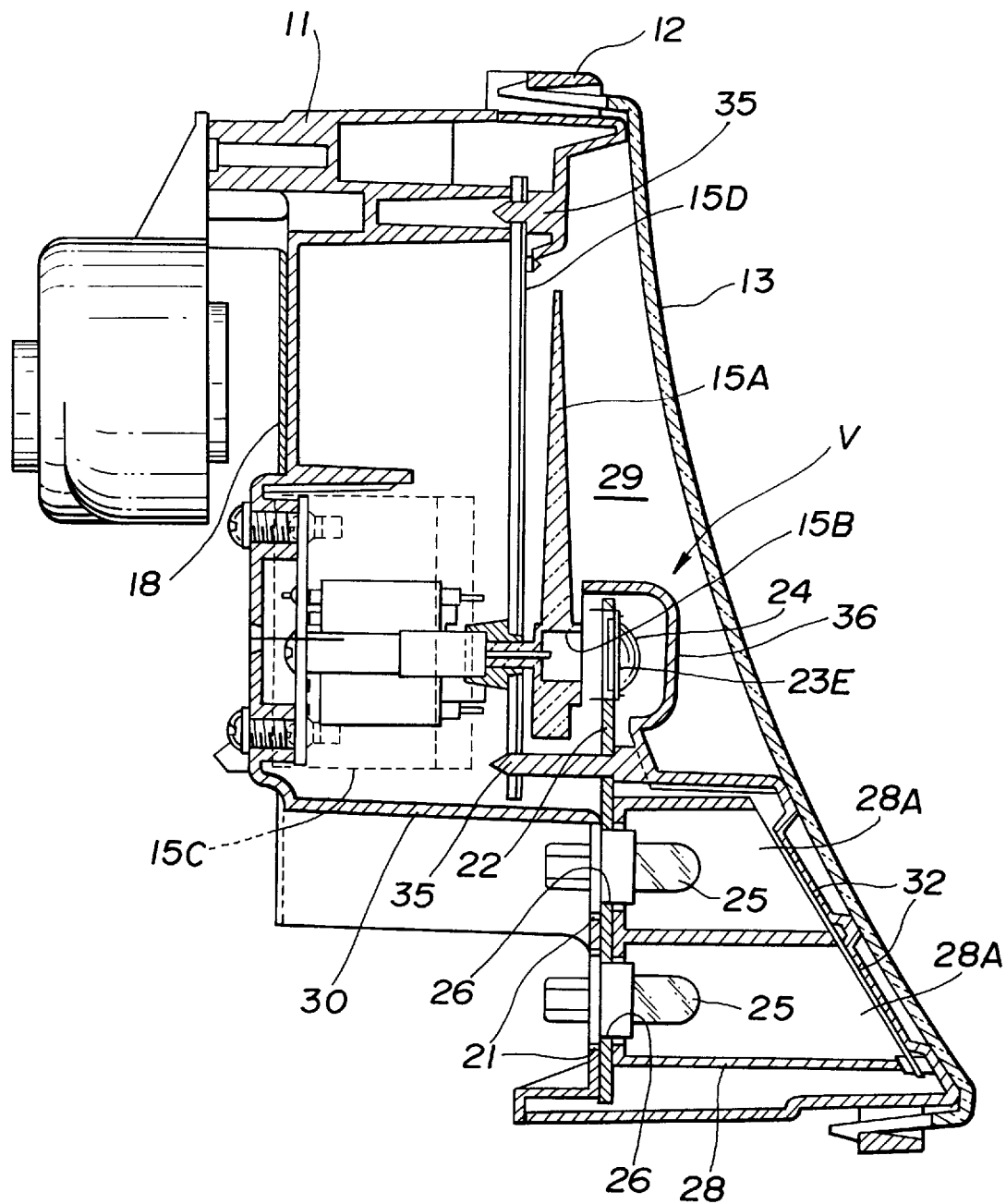
FIG. 2 is an enlarged sectional view taken along the line 2—2 of FIG. 1.
Figure 3:
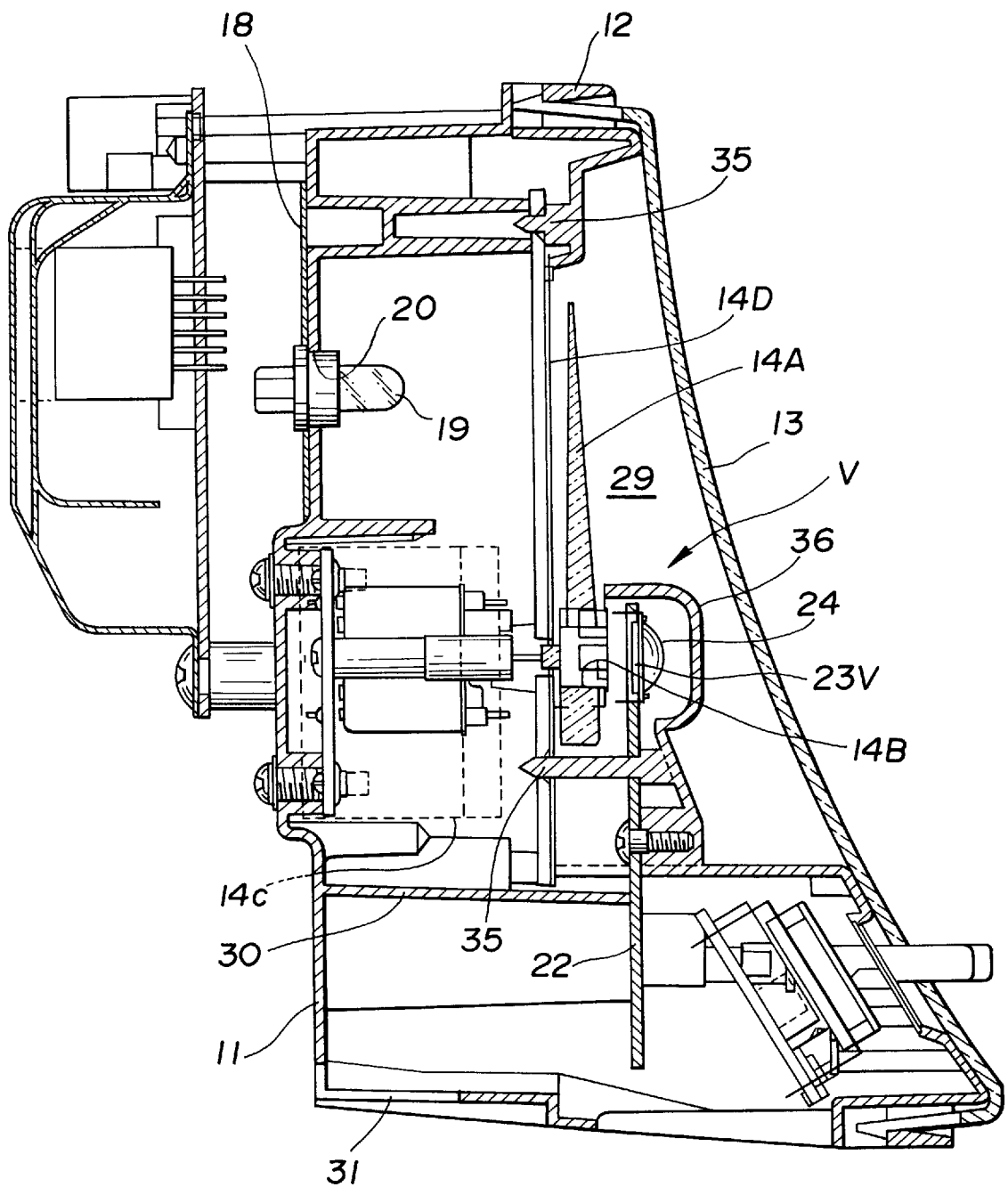
FIG. 3 is an enlarged sectional view taken along the line 3—3 of FIG. 1.

As is best seen from FIGS. 2 and 3, the meter assembly of the invention comprises rear and front housings 11 and 12 which are coupled to constitute a box-like meter case. The front housing 12 has a front opening covered with a semi-transparent dark cover 13. Due to usage of this dark cover 13, the meter assembly is called a black face type.

Figure 4:
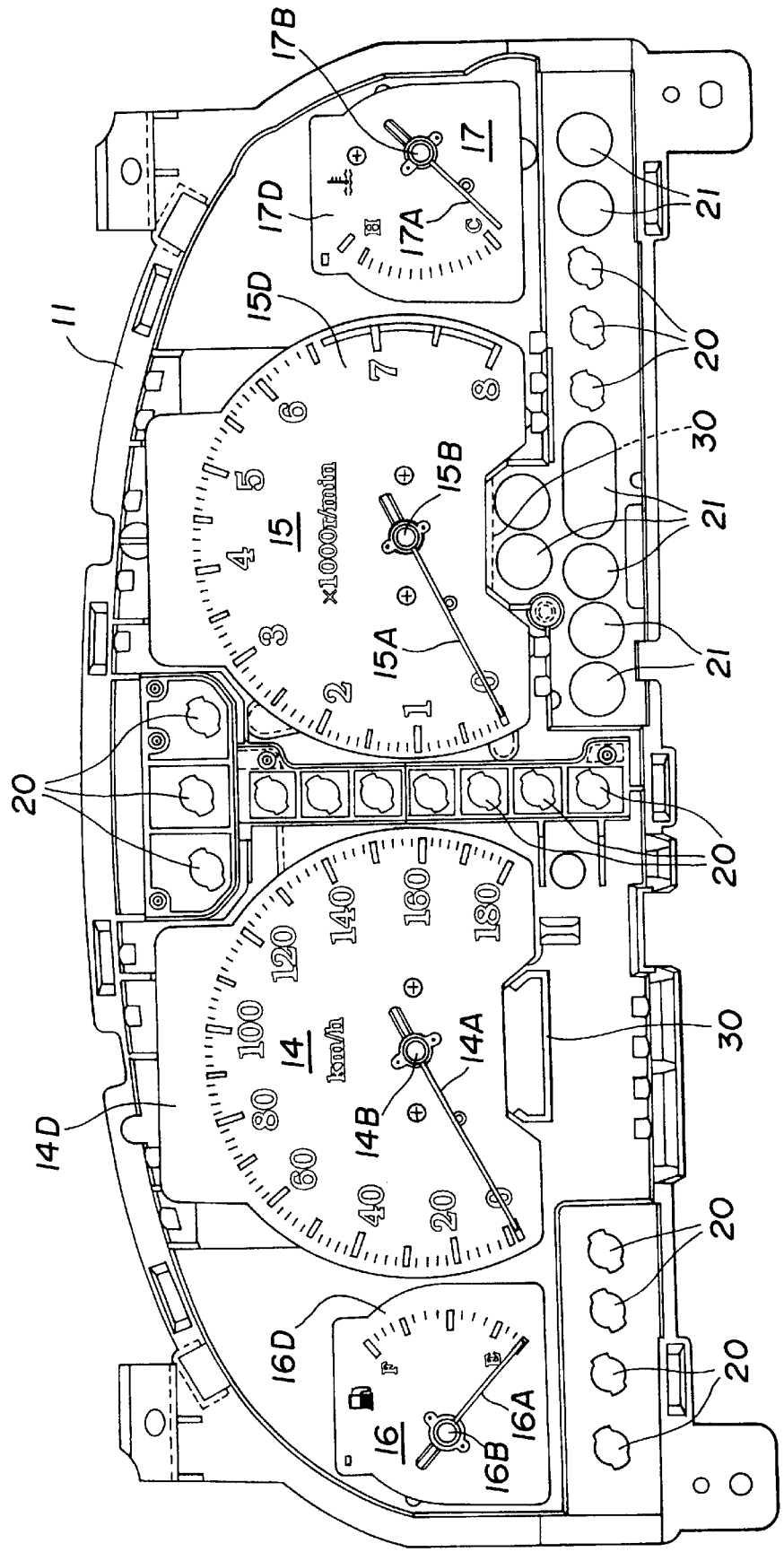
FIG. 4 is a front view of the meter assembly of the invention with a front housing removed.

As is seen from FIG. 4 which shows a front view of the meter assembly with the front housing 12 removed, within the rear housing 11, there are arranged a vehicle speed meter unit 14, an engine speed meter unit 15, a fuel level gauge unit 16 and an engine coolant temperature meter unit 17. These meter units 14, 15, 16 and 17 are equipped with dial boards 14D, 15D, 16D and 17D respectively.

Figure 6:
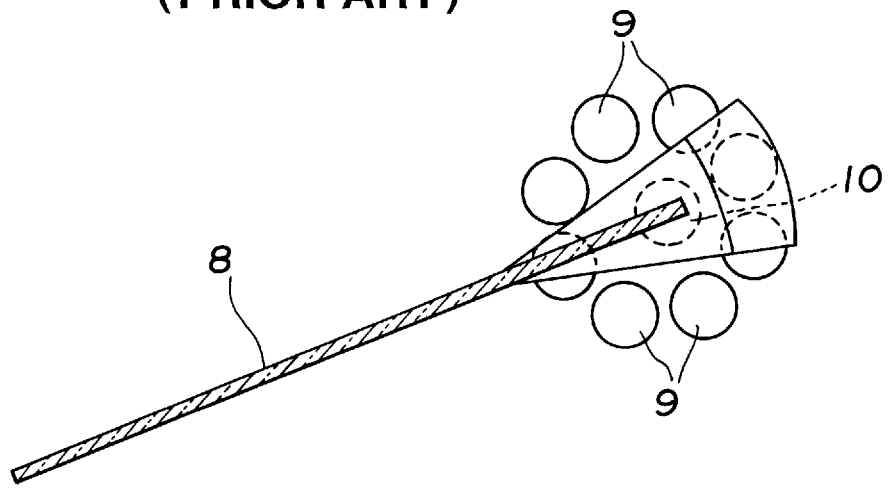
FIG. 6 is a front, but partial, view of a conventional meter assembly of black face type.

As will be described in detail hereinafter, these meter units 14, 15, 16 and 17 have respective transparent pointers 14A, 15A, 16A and 17A which can be illuminated from within. For this illumination, each meter unit 14, 15, 16 or 17 is equipped with an after-mentioned light emitting unit "V" which corresponds to the light emitting unit "U" of the meter assembly of FIG. 6. Thus, the base portion of each pointer 14A, 15A, 16A of 17A is formed at a front face with a light receiving recess 14B, 15B, 16B or 17B which faces to a light source of a corresponding light emitting unit.

As is seen from FIGS. 2 and 3, on a back side of the rear housing 11, there is attached a flexible printed circuit board 18 which has various circuits patterns for drive parts of the meter units 14, 15, 16 and 17, indicator lamps, warning lamps, illumination lamps and the like. The drive unit 15C of the engine speed meter unit 15 is shown in FIG. 2, and the drive unit 14C of the vehicle speed meter unit 14 is shown in FIG. 3.

Referring back to FIG. 4, the rear housing 11 is formed at given portions with a plurality of socket openings 20 which are respectively mated with the circuit patterns or the circuit board 18.

As is understood from FIG. 3, the socket openings 20 have respective lamps 19 put therein through known couplers. These lamps 19 are the above-mentioned indicator lamps, warning lamps and the illumination lamps. Due to usage of the coupler, only by thrusting the lamp 19 into a corresponding socket opening 20, setting of the lamp 19 in the socket opening 20 is properly and quickly achieved.

As is seen from FIGS. 2 and 4, the rear housing 11 is formed at given portions with circular and oval openings 21 through which after-mentioned secondary warning lamps 25 are passed when it is desired to set them to given socket openings 26 of an after-mentioned rigid printed circuit board 22.

Figure 5:
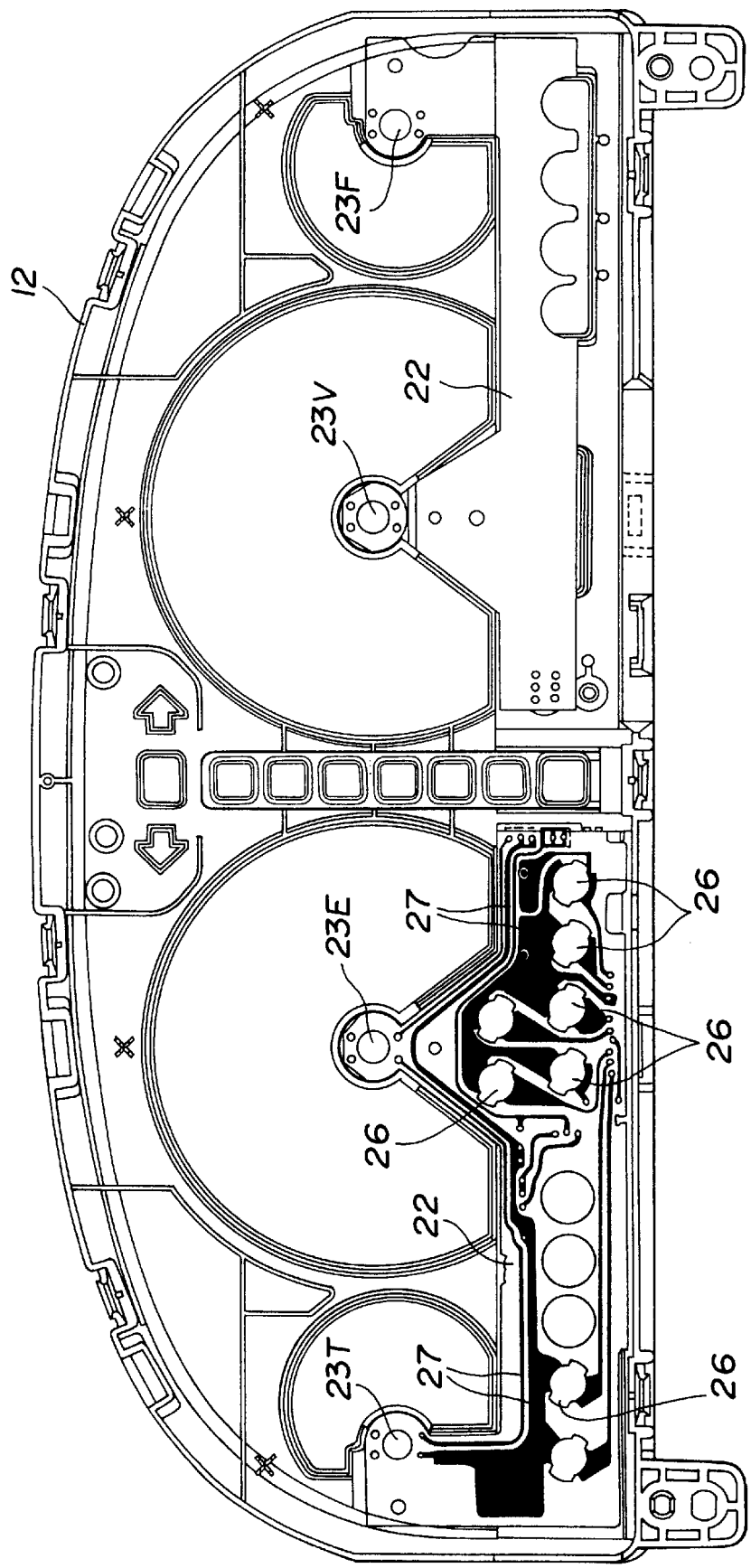
FIG. 5 is a back view of the front housing.

As is seen from FIG. 5 which shows a back view of the front housing 12, a rigid printed circuit board 22 is integrally attached to a lower part of the rear side of the front housing 12. For simplification, the circuit board 22 attached to a right half of the front housing 12 is not illustrated in FIG. 5.

As is seen from FIGS. 2, 3 and 5, particularly FIG. 5, the rigid circuit board 22 is formed with four raised portions each having a light emitting diode 23V, 23E, 23F or 23T connected thereto. As is seen from FIGS. 2 and 3, the four diodes 23V, 23E, 23F and 23T face toward the light receiving recesses 14B, 15B, 16B and 17B of the corresponding pointers 14A, 15A, 16A and 17A. As shown in FIGS. 2 and 5, the given socket openings 26 for the secondary warning lamps 25 are provided below the diode 23E used for the pointer 15A of the engine speed meter unit 15. Circuit patterns 27 for the light emitting diodes 23V, 23E, 23F, 23T and 25 are defined by the rigid printed circuit board 22.

As is understood from FIG. 2, behind each light emitting diode 23E (23V, 23F or 23T), there is arranged a concave mirror 24 for increasing the quantity of light directed toward the light receiving recess 15B (14B, 16B or 17B) of the pointer 15A (14A, 16A or 17A). Preferably, the mirror 24 is a mirror manufactured by IWASAKI DENKI CO., LTD, of which part No. is DDH-1160. Behind the mirror 24, there is positioned a cup-shaped screen member 36 which is integral with the front housing 12.

Thus, in the invention, the light emitting diode 23E, the concave mirror 24, the raised portion of the circuit board 22 and the cup-shaped screen member 36 constitute a so-called light emitting unit "V".

As is understood from FIG. 2 or FIG. 3, when the rear and front housings 11 and 12 are properly coupled, the light emitting diodes 23E, 23V, 23F and 23T on the front housing 12 properly face toward the light receiving recesses 15B, 14B, 16B and 17B of the corresponding the pointers 15A, 14A, 16A and 17A on the rear housing 11. Upon this coupling, there is defined a certain space 29 between the dial board 15D (14D, 16D or 17D) and the front cover 13. Designated by numeral 30 is a sealing wall of the rear housing 11 for isolating the space 29 from the outside air. As is seen from FIG. 3, the sealing wall 30 has a leading edge contacting the rigid printed circuit board 22. With this, the space 29 is protected from being contaminated with foreign things floating in the outside air. Designated by numeral 35 are positioning ribs possessed by the front housing 12, which are projected into openings formed in a peripheral portion of each dial board 15D, 14D, 16D or 17D.

As is seen from FIG. 2, the secondary warning lamps 25 are projected into respective warning lamp chambers 28A of a warning lamp housing 28 formed in a lower part of the front housing 12. The socket openings 26 of the rigid printed circuit board 22 are mated with the openings 21 of the rear housing 11. Thus, setting the lamps 25 to the socket openings 26 is easily achieved by passing them through the openings 21 from the back side. Of course, replacement of the lamps 25 is easily achieved by only pulling them backward without disassembling the meter case.

Figure 1:
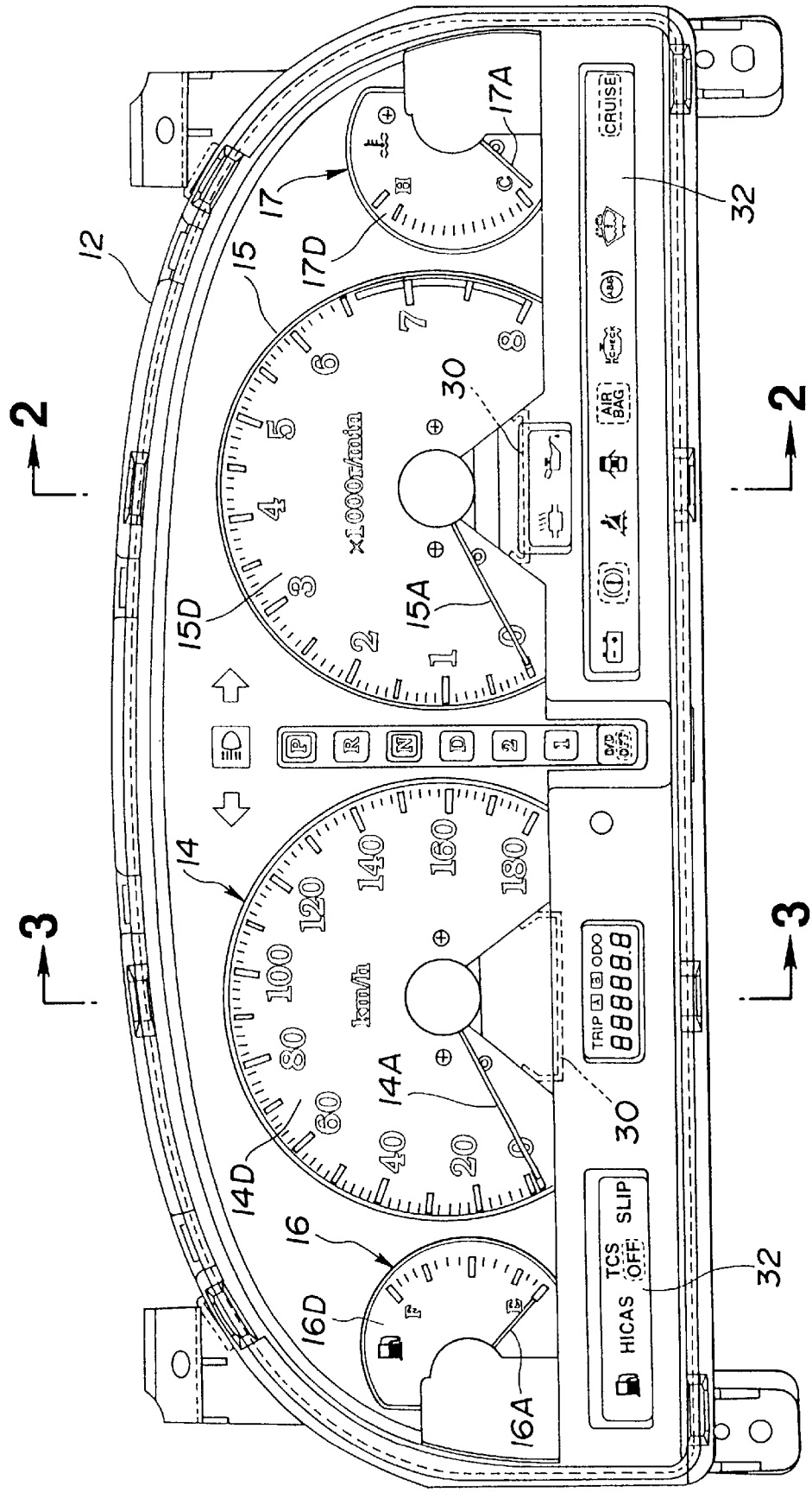
FIG. 1 is a front view of a meter assembly according to the present invention.

Designated by numeral 32 in FIG. 1 are lens 32 which are attached to a front face of the front housing 12 to magnify warning marks placed therebehind.

In the following, advantages of the present invention will be described.

Due to usage of the cover 13 which is semitransparent and dark, the unsightly light emitting unit "V" is not viewed from the outside even when the meter units 14, 15, 16 and 17 are illuminated. This increases the aesthetic value of the meter assembly.

Because light in weight, the pointer 14A, 15A, 16A or 17A can move quickly and smoothly in response to actuation of the drive part 14C, 15C, 16C or 17C. In fact, there is no need of providing the pointer with a screen board like the screen board used in the pointer 8 of FIG. 6.

Because the light emitting unit "V" is compact in size, the pointer 14A, 15A, 16A or 17A and the dial board 14D, 15D, 16D or 17D can offer satisfied effective area.

Figure 7:
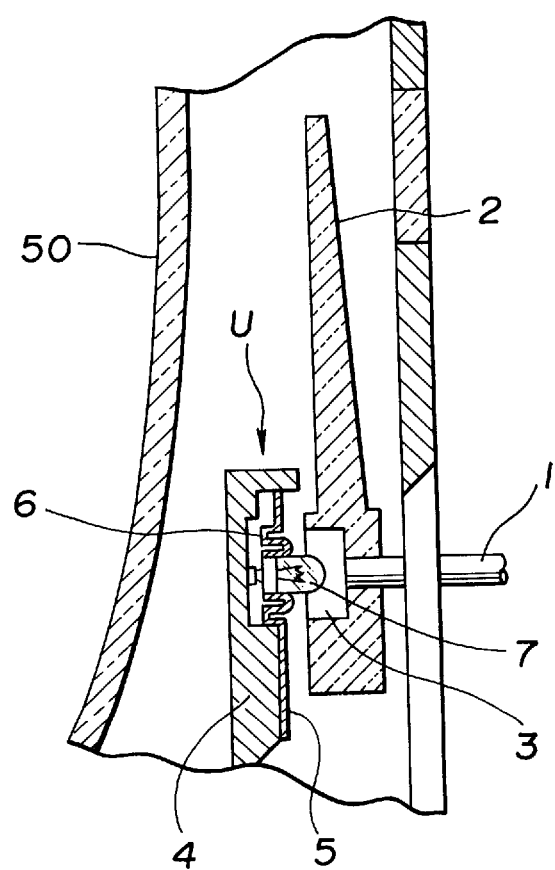
FIG. 7 is an enlarged sectional, but partial, view of a conventional meter assembly which is not of black face tape.

Because the light source is a light emitting diode (LED) which generates less heat, there is no fear about deformation of the plastic pointer caused by heat as in case of the conventional meter assembly of FIG. 7.

Because the light emitting diode 23V, 23E, 23F or 23T is directly supported by the rigid printed circuit board 22, compact and assured connection therebetween is achieved.

Usage of the concave mirror 24 can increase the quantity of light which enters the pointer 14A, 1SA, 16A or 17A.

Due to usage of the sealing wall 30, the interior of the meter assembly is protected from being contaminated with foreign things floating in the open air.

Due to usage of two types of printed boards (viz., the flexible printed circuit board 18 and the rigid printed circuit board 22), various types of circuit patterns can be freely provided.

Replacement of the warning lamps 25 is easily achieved by only pulling them in one direction.

What is claimed is:

1. A meter assembly comprising:

a meter case including rear and front housings which are coupled, said front housing having an opening formed therethrough;

a meter unit installed in said meter case, said meter unit including a dial board facing toward the opening of said front housing, a transparent pointer movable over said dial board and a light emitting unit located in front of said pointer to emit a light to illuminate the transparent pointer from within, said light emitting unit including a light emitting diode emitting a light toward a base portion of said transparent pointer, and a raised part of a rigid printed circuit board which supports said light emitting diode while providing an electric connection therebetween; and a semitransparent dark cover which covers the opening of said front housing, wherein said rigid printed circuit board is formed with socket openings for holding lamps and said rear housing is formed with openings which are mated with said socket openings in such a manner that the lamps can be removed through the openings.

2. A meter assembly as claimed in claim 1, in which said rigid printed circuit board is attached to a back surface of said front housing.

3. A meter assembly as claimed in claim 2, in which said light emitting unit further comprises a concave mirror positioned behind the light emitting diode to increase the quantity of light directed toward said base portion of said pointer, said mirror being supported by said raised part of the rigid printed circuit board.

4. A meter assembly as claimed in claim 3, in which said light emitting unit further comprises a cut-shaped screen member which screens said light emitting diode and said concave mirror.

5. A meter assembly as claimed in claim 4, in which said cup-shaped screen member is integral with said front housing.

6. A meter assembly as claimed in claim 1, in which said base portion of the pointer is formed with a circular recess.

7. A meter assembly as claimed in claim 1, further comprising means which causes said light emitting unit to emit the light only when an ignition switch of an associated motor vehicle is turned ON.

8. A meter assembly as claimed in claim 1, in which said rear housing is formed with a sealing wall which effects a sealing between the rear and front housings thereby protecting the interior of the meter case from being contaminated with foreign things floating in the open air.

9. A meter assembly comprising:

a meter case including rear and front housings which are coupled, said front housing having an opening formed therethrough;

a meter unit installed in said meter case, said meter unit including a dial board facing toward the opening of said front housing, a transparent pointer movable over said dial board and a light emitting unit located in front of said pointer to emit a light to illuminate the transparent pointer from within; and a semitransparent dark cover which covers the opening of said front housing, wherein said rear housing is formed with a sealing wall which effects a sealing between the rear and front housings, thereby protecting an interior of the meter case from being contaminated with air and pollutants external to the meter case.

* * * * *